(12) United States Patent
Hatano et al.

(10) Patent No.: US 7,755,688 B2
(45) Date of Patent: Jul. 13, 2010

(54) PHOTOELECTRIC CONVERSION DEVICE AND IMAGE SENSING SYSTEM

(75) Inventors: Yuuichirou Hatano, Yamato (JP); Hiroki Hiyama, Zama (JP); Yuu Arishima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 457 days.

(21) Appl. No.: 11/847,105

(22) Filed: Aug. 29, 2007

(65) Prior Publication Data

US 2008/0055445 A1 Mar. 6, 2008

(30) Foreign Application Priority Data

Aug. 31, 2006 (JP) ............... 2006-236753
Aug. 1, 2007 (JP) ............... 2007-201101

(51) Int. Cl.
H04N 3/14 (2006.01)
H04N 5/335 (2006.01)
H04N 5/217 (2006.01)

(52) U.S. Cl. ............ 348/300; 348/308; 348/241
(58) Field of Classification Search ............ 348/300, 348/304
See application file for complete search history.

(56) References Cited

U.S. PATENT DOCUMENTS

| | | | | |
|---|---|---|---|---|
| 5,892,540 | A | 4/1999 | Kozlowski et al. | 348/300 |
| 6,111,606 | A * | 8/2000 | Ikeda | 348/241 |
| 6,670,990 | B1 | 12/2003 | Kochi et al. | 348/310 |
| 6,747,264 | B2 * | 6/2004 | Miida | 250/214 AG |
| 6,864,919 | B2 * | 3/2005 | Hua | 348/241 |
| 6,960,751 | B2 | 11/2005 | Hiyama et al. | 250/208.1 |
| 7,023,482 | B2 * | 4/2006 | Sakuragi | 348/308 |
| 7,075,474 | B2 * | 7/2006 | Yamagata et al. | 348/241 |
| 7,110,030 | B1 | 9/2006 | Kochi et al. | 348/308 |
| 7,135,668 | B2 * | 11/2006 | Kochi et al. | 250/214 R |
| 7,189,955 | B2 * | 3/2007 | Simony | 250/208.1 |
| 7,265,329 | B2 * | 9/2007 | Henderson et al. | 250/208.1 |
| 7,460,164 | B2 * | 12/2008 | Hyama et al. | 348/300 |
| 7,463,282 | B2 * | 12/2008 | Nakamura et al. | 348/241 |
| 7,486,320 | B2 * | 2/2009 | Hiyama et al. | 348/300 |
| 7,508,429 | B2 * | 3/2009 | Lim et al. | 348/241 |
| 7,514,690 | B2 * | 4/2009 | Endo et al. | 250/370.14 |
| 7,561,199 | B2 * | 7/2009 | Noda et al. | 348/308 |

(Continued)

FOREIGN PATENT DOCUMENTS

JP 2005269471 A 9/2005

*Primary Examiner*—John M Villecco
(74) *Attorney, Agent, or Firm*—Fitzpatrick, Cella, Harper & Scinto

(57) ABSTRACT

This invention discloses a photoelectric conversion device. The photoelectric conversion device includes a pixel array in which a plurality of pixels are arrayed in a row direction and a column direction, a plurality of readout circuits which read out signals from pixels for respective columns in the pixel array, and a control unit which controls the plurality of readout circuits, wherein each of the plurality of readout circuits includes a holding unit which holds a reference voltage supplied from an external power source, an operational amplification unit which amplifies the signals from the pixels for each column based on the reference voltage held in the holding unit, and a disconnection unit which electrically disconnects the external power source and the holding unit, and the control unit controls the disconnection unit to electrically disconnect the external power source and the holding unit when the operational amplification unit amplifies the signals from the pixels for each column.

16 Claims, 9 Drawing Sheets

U.S. PATENT DOCUMENTS

| | | | |
|---|---|---|---|
| 7,643,077 B2 * | 1/2010 | Endo et al. | 348/308 |
| 2001/0012070 A1 * | 8/2001 | Enod et al. | 348/302 |
| 2003/0164887 A1 | 9/2003 | Koizumi et al. | 348/308 |
| 2005/0237400 A1 * | 10/2005 | Blerkom et al. | 348/241 |
| 2006/0044439 A1 * | 3/2006 | Hiyama et al. | 348/308 |
| 2007/0001098 A1 * | 1/2007 | Sano | 250/208.1 |
| 2007/0097240 A1 * | 5/2007 | Egawa et al. | 348/308 |
| 2008/0174672 A1 * | 7/2008 | Hiyama et al. | 348/222.1 |

* cited by examiner

PHOTOELECTRIC CONVERSION DEVICE AND IMAGE SENSING SYSTEM

BACKGROUND OF THE INVENTION

1. Field of the Invention

The present invention relates to a photoelectric conversion device and an image sensing system.

2. Description of the Related Art

A photoelectric conversion device including an operational amplifier is available as an active-type photoelectric conversion device. As shown in FIG. 9, a photoelectric conversion device 100 includes a pixel array, a plurality of readout circuits 130, a vertical shift register 123, and a horizontal shift register 119. A plurality of pixels GU11 to GUmn (m: natural number, n: natural number) are two-dimensionally (in the row and column directions) arranged in the pixel array. The readout circuit 130 is arranged for each of the columns in the pixel array (the plurality of pixels GU11 to GUmn). Each of the vertical shift register 123 and the horizontal shift register 119 is connected to the pixels GU11 to GUmn.

The vertical shift register 123 selects a readout row (pixel row) by activating a select signal PSEL1, PSEL2, ... to turn on a select transistor 105. In each pixel on the selected row, an amplification transistor 104 converts, into a signal (a noise signal or a photogenerated signal), a charge signal read out from a photodiode 101 to a floating diffusion (to be referred to as an FD hereinafter) via a transfer transistor 102 according to an activated transfer signal PTX1, PTX2, .... The amplification transistor 104 outputs the signal (the noise signal or the photogenerated signal) via the select transistor 104 to a vertical signal line 106. The readout circuit 130 reads out the converted signal via the vertical signal line 106 for each column of the pixels, and stores it. The horizontal shift register 119 sequentially turns on horizontal transfer switches 114 according to horizontal shift signals H1, H2, ..., and sequentially outputs the signals held in the readout circuit 130 for each column, via a horizontal signal line 116 and an output circuit 118. Note that, by means of activating a reset signal PRES1, PRES2, ..., a reset transistor 103 in each pixel turns on to reset the FD.

In the readout circuit 130, a clamp capacitance 108 stores the signals read out via the vertical signal line 106. An operational amplifier 120 amplifies the difference according to a capacitance ratio of a capacitance 121 to the clamp capacitance 108 between the stored noise signal and photogenerated signal based on a reference voltage VREF input from an external power source. A line memory 112 holds the amplified signal when a transistor 110 turns on in response to activation of a signal PT. Note that, by means of activating a signal PCVR, a transistor 107 turns on to reset the vertical signal line 106, and that, by activating a signal PCOR, a transistor 109 turns on to reset the operational amplifier 120.

Japanese Patent Laid-Open No. 2005-269471 proposes a technique which uses a readout circuit including an operational amplifier which amplifies a stored signal based on the reference voltage (clamp voltage Vclp) input from the external power source, as described above.

However, according to the technique disclosed in Japanese Patent Laid-Open No. 2005-269471, when disturbance noise is mixed into the reference voltage to be input to the operational amplifier in the readout circuit, the disturbance noise may be superposed on a signal (a noise signal or a photogenerated signal). Accordingly, random stripe noise sometimes appears in a formed image in accordance with the difference between the noise signal and the photogenerated signal.

SUMMARY OF THE INVENTION

It is an object of the present invention to provide a photoelectric conversion device and an image sensing system which can suppress superposition of disturbance noise on a signal.

According to the first aspect of the present invention, there is provided a photoelectric conversion device comprising a pixel array in which a plurality of pixels are arrayed in a row direction and a column direction, a plurality of readout circuits which read out signals from pixels for respective columns in the pixel array, and a control unit which controls the plurality of readout circuits, wherein each of the plurality of readout circuits includes a holding unit which holds a reference voltage applied from an external power source, an operational amplification unit which amplifies the signals from the pixels for each column based on the reference voltage held in the holding unit, and a disconnection unit which electrically disconnects the external power source and the holding unit, and the control unit controls the disconnection unit to electrically disconnect the external power source and the holding unit when the operational amplification unit amplifies the signals from the pixels for each column.

According to the second aspect of the present invention, there is provided an image sensing system comprising the above-described photoelectric conversion device, an optical system which forms an image on an image sensing plane of the photoelectric conversion device, and a signal processing unit which processes a signal output from the photoelectric conversion device, and generates image data.

According to the third aspect of the present invention, there is provided a driving method for a photoelectric conversion device which includes a pixel array in which a plurality of pixels are arrayed in a row direction and a column direction, and a readout circuit which reads out signals from pixels in the pixel array, the readout circuit including a holding unit which holds a reference voltage applied from an external power source, the driving method comprising an application step of applying the reference voltage from the external power source to the holding unit, a disconnection step of electrically disconnecting the external power source and the holding unit after the application step, and an amplification step of amplifying signals from pixels for each column based on the reference voltage held by the holding unit.

The present invention can suppress superposition of disturbance noise on a signal.

Further features of the present invention will become apparent from the following description of exemplary embodiments with reference to the attached drawings.

DESCRIPTION OF THE EMBODIMENTS

Figure 1:
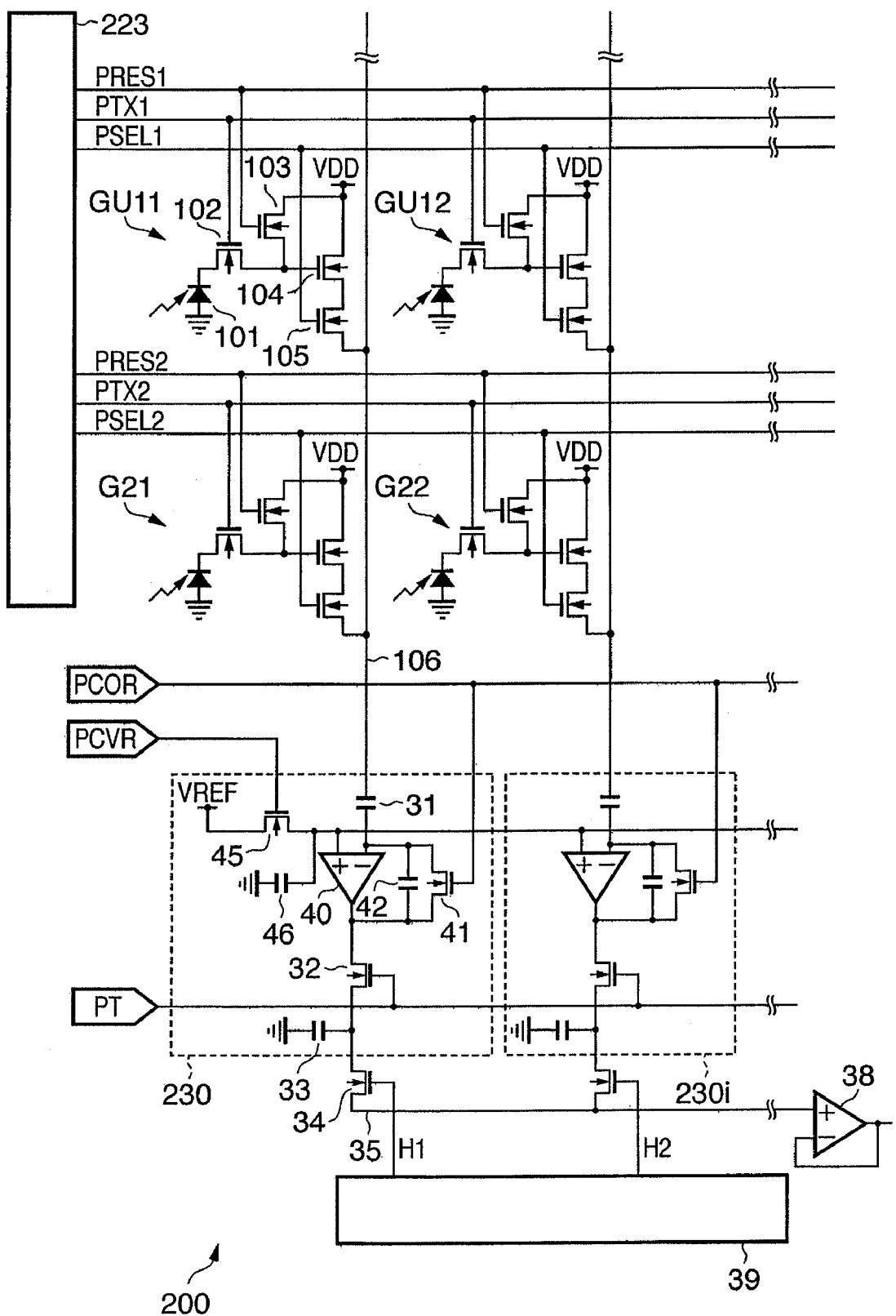
FIG. 1 is a diagram of a photoelectric conversion device according to the first embodiment of the present invention.
Figure 2:
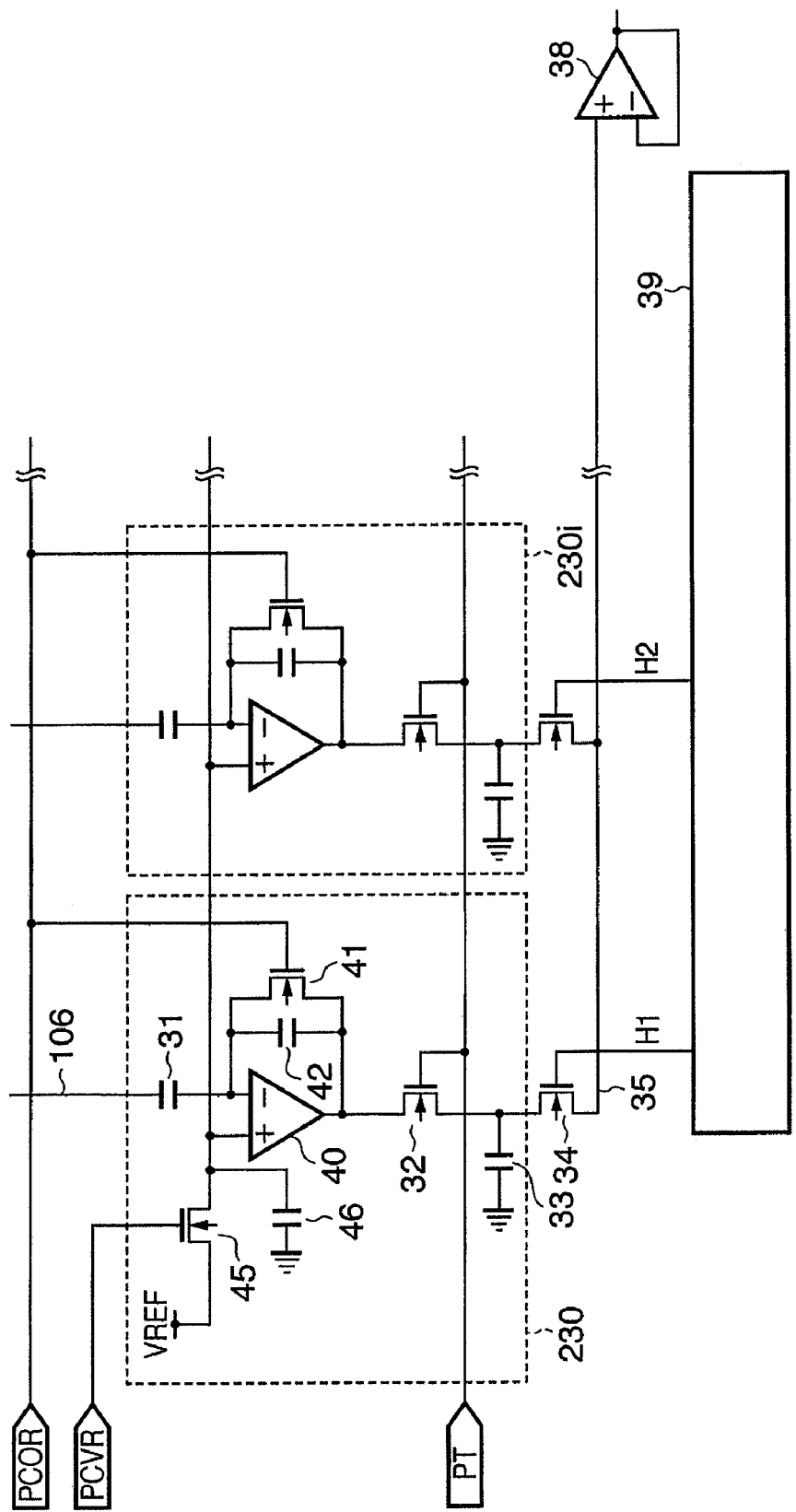
FIG. 2 is a diagram of a readout circuit according to the first embodiment of the present invention.
Figure 3:
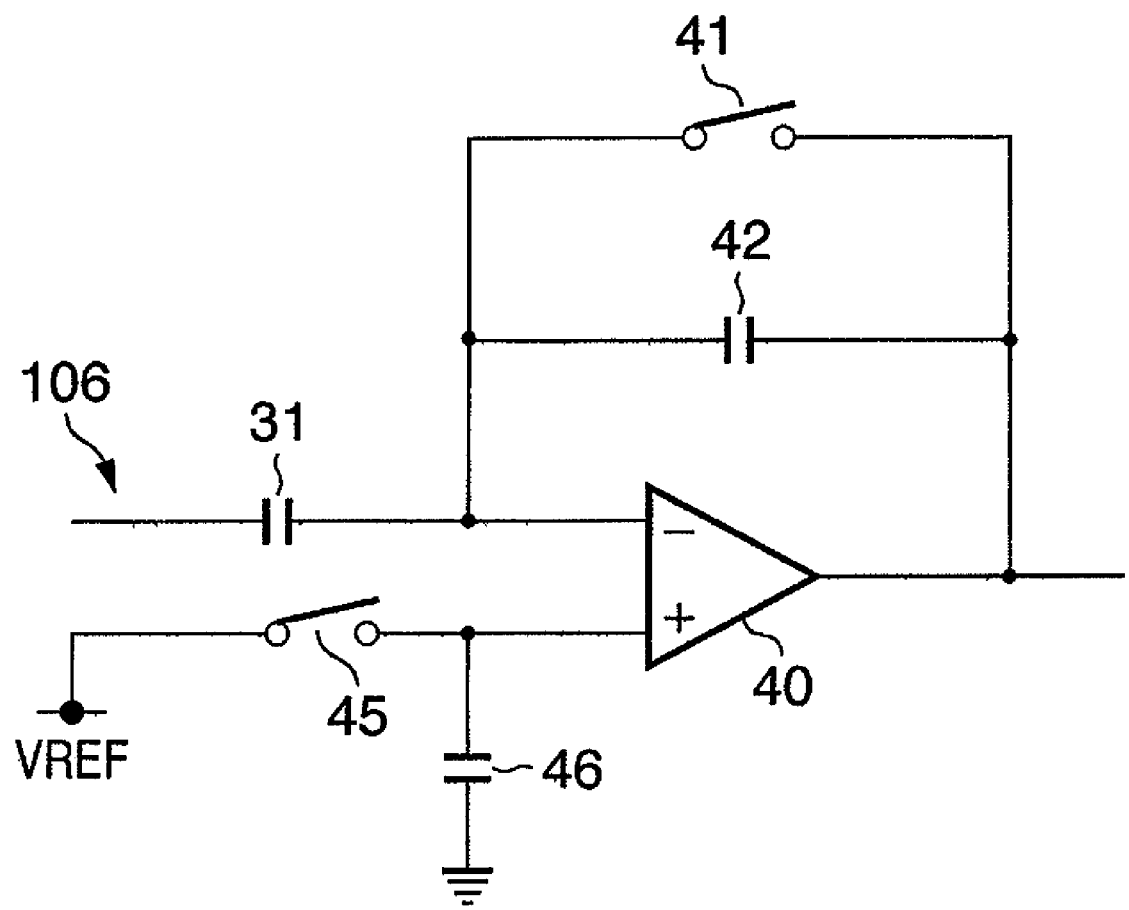
FIG. 3 is a circuit diagram showing the arrangement of an operational amplifier and a holding capacitance according to the first embodiment of the present invention.
Figure 4:
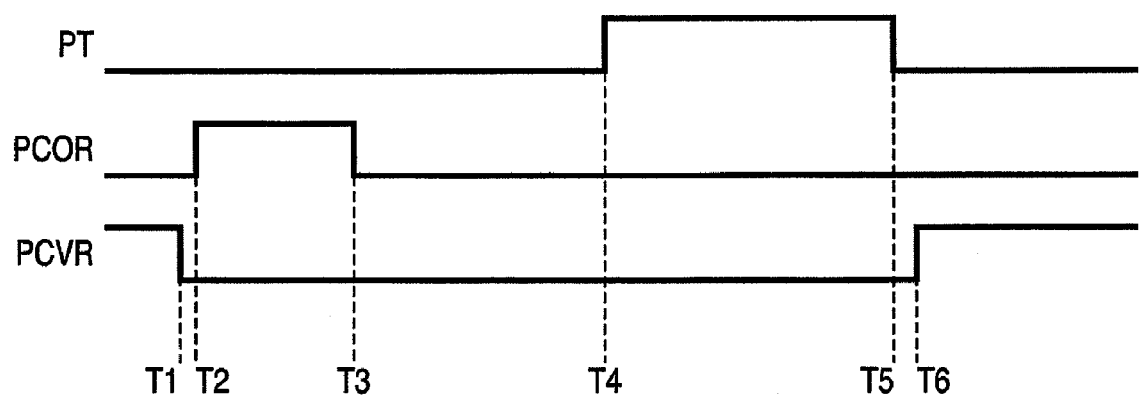
FIG. 4 is a timing chart of a signal supplied to the readout circuit.

A photoelectric conversion device according to the first embodiment of the present invention will be described below with reference to FIGS. 1 to 4. FIG. 1 is a diagram of the photoelectric conversion device according to the first embodiment of the present invention. FIG. 2 is a diagram of a readout circuit according to the first embodiment of the present invention. FIG. 3 is a circuit diagram showing the arrangement of an operational amplifier and a holding capacitance according to the first embodiment of the present invention. FIG. 4 is a timing chart of a signal supplied to the readout circuit. In this embodiment, what is different from a photoelectric conversion device 100 shown in FIG. 9 will mainly be described, and a repetitive description will be omitted.

A photoelectric conversion device 200 includes a readout circuit 230 and a plurality of readout circuits 230i in place of readout circuits 130, and also includes a vertical shift register (control unit) 223 in place of a vertical shift register 123. As shown in FIG. 2, the readout circuit 230 is connected only to the pixels of the first column. The plurality of readout circuits 230i are connected to the pixels of the second to $n^{th}$ columns (n: integer, n>2). Each of the readout circuit 230 and the plurality of readout circuits 230i reads out signals from the pixels for the corresponding column in the pixel array. Each of the readout circuit 230 and the plurality of readout circuits 230i receives a PCOR signal, PCVR signal, and PT signal from the vertical shift register 223 via input terminals, and operates in accordance with these signals. That is, the vertical shift register 223 controls (drives) the readout circuit 230 and the plurality of readout circuits 230i.

The readout circuit 230 includes a holding capacitance (holding unit) 46, operational amplifier (operational amplification unit) 40, and switch (disconnection unit) 45. One terminal of the holding capacitance 46 is connected to the switch 45 and the noninverting input terminal (reference input node) (+) of the operational amplifier 40. The other terminal of the holding capacitance 46 is connected to a power supply or low-impedance wiring such as GND (fixed potential).

Each of the plurality of readout circuits 230i is different from the readout circuit 230 in that the readout circuit 230i does not include the holding capacitance 46. That is, all the plurality of readout circuits 230 and 230i share the holding capacitance 46 and the switch 45.

Figure 9:
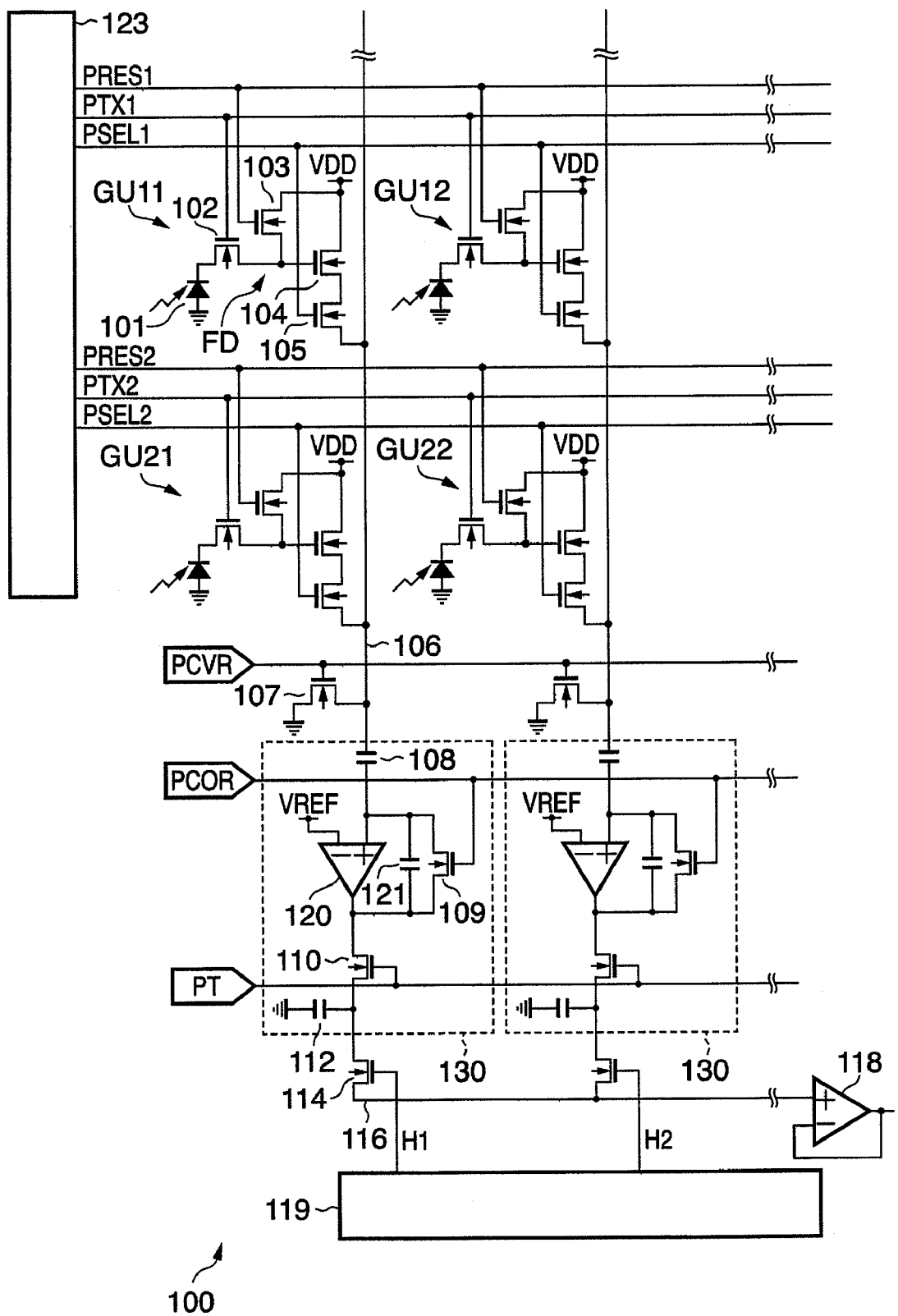
FIG. 9 is a diagram for explaining the background art.

Note that the following points are the same as those of the pixel array 100 shown in FIG. 9. A plurality of pixels GU11 to GUmn (m: natural number, n: integer, n>2) are two-dimensionally (in the row and column directions) arranged in the pixel array. The vertical shift register 223 selects a readout row (pixel row) by means of activating a select signal PSEL1, PSEL2, . . . to turn on a select transistor 105. In each pixel on the selected row, a photodiode (photoelectric conversion device) 101 converts incident light into an electrical signal. An amplification transistor (amplification unit) 104 converts, into a signal (a noise signal or a photogenerated signal), a charge signal read out from the photodiode 101 to a floating diffusion (to be referred to as an FD hereinafter) via a transfer transistor 102 according to a activated transfer signal PTX1, PTX2, . . . . The amplification transistor 104 outputs the signal (the noise signal or the photogenerated signal) via the select transistor 104 to a vertical signal line 106. Each of the readout circuits 230 and 230i reads out the output signal via the vertical signal line 106 for each column of the pixels, and stores it. A horizontal shift register 39 sequentially turns on horizontal transfer switches 34 according to horizontal shift signals H1, H2, . . . , and sequentially outputs the signals held in the readout circuits 230 and 230i for respective columns, via a horizontal signal line 35 and an output circuit 38. Note that, by activating a reset signal PRES1, PRES2, . . . , a reset transistor 103 in each pixel turns on to reset the FD. A clamp capacitance 31, a capacitance 42, a transistor 32, and a line memory 33 may be respectively like a clamp capacitance 108, a capacitance 121, a transistor 110, and a line memory 112, in FIG. 9.

The detailed arrangement of the operational amplifier 40 and the holding capacitance 46 will be described with reference to FIG. 3. In the description of FIGS. 3 and 4, a transistor 41 and the transistor 45 are functionally referred to as the first and second switches 41 and 45.

One terminal of the holding capacitance 46 is connected to the noninverting input terminal (+) of the operational amplifier 40. The other terminal of the holding capacitance 46 is connected to a power supply or low-impedance wiring such as GND (fixed potential). The noninverting input terminal (+) of the operational amplifier 40 is connected via the second switch 45 to an external power source supplying the reference voltage (fixed potential) VREF.

On the other hand, the inverting input terminal (−) of the operational amplifier 40 is connected to the vertical signal line 106 via a clamp capacitance 31. The first switch 41 and a feedback capacitance 42 are parallelly connected between the output terminal and inverting input terminal of the operational amplifier 40.

The detailed operation of the operational amplifier 40 and the holding capacitance 46 will be described with reference to FIG. 4.

Right before timing T1 (supply step), the vertical shift register 223 (a control unit, see FIG. 1) sets (activates) a PCVR signal to Hi. With this operation, the second switch 45 arranged between the holding capacitance 46 and an external power source is turned on, and the external power source supplies a reference voltage (fixed potential) VREF to the holding capacitance 46 (charges the holding capacitance 46) via a reference voltage line.

At timing T1 (disconnection step) before a signal readout period, the vertical shift register 223 (see FIG. 1) changes (deactivates) the PCVR signal from Hi to Low. With this operation, the second switch 45 arranged between the holding capacitance 46 and the external power source is turned off, and the external power source is electrically disconnected from the holding capacitance 46. Then, the holding capacitance 46 holds the reference voltage.

At timing T2, the vertical shift register 223 (see FIG. 1) changes (activates) a PCOR signal from Low to Hi. With this operation, since the first switch 41 arranged between the inverting input terminal and output terminal of the operational amplifier 40 is turned on, the operational amplifier 40 changes to a voltage follower state, and the output of the operational amplifier 40 is reset to the reference voltage VREF.

At timing T3, the vertical shift register 223 (see FIG. 1) changes (deactivates) the PCOR signal from Hi to Low. With this operation, the first switch 41 connected between the inverting input terminal and output terminal of the operational amplifier 40 is turned off, and the operational amplifier 40 is fed back from output to input via the feedback capacitance 42. Based on the reference voltage VREF input from the external power source, the operational amplifier 40 amplifies the signal stored in the clamp capacitance 31 in accordance with the capacitance ratio between the feedback capacitance 42 and the clamp capacitance 31.

In the period between the timings T3 and T4 (amplification step), the clamp capacitance 31 stores a noise signal and a photogenerated signal transmitted via the vertical signal line 106. The operational amplifier 40 amplifies a signal depending on the difference between the noise signal and the photogenerated signal, and outputs it.

At timing T4, the vertical shift register 223 (see FIG. 1) changes (activates) a PT signal from Low to Hi. With this operation, a transistor 32 (see FIG. 2) is turned on, and the signal (difference signal) output from the operational amplifier 40 is supplied to a line memory 33.

At timing T5, the vertical shift register 223 (see FIG. 1) changes (deactivates) the PT signal from Hi to Low. With this operation, the transistor 32 (see FIG. 2) is turned off, and the operational amplifier 40 is disconnected from the line memory 33.

At timing T6, the vertical shift register 223 (see FIG. 1) changes (activates) the PCVR signal to Hi. With this operation, the second switch 45 arranged between the holding capacitance 46 and the external power source is turned on, and the external power source supplies the reference voltage VREF to the holding capacitance 46 (charges the holding capacitance 46) again.

As described above, when the circuit samples and holds the noise signal or the photogenerated signal or when the circuit operates the difference between the noise signal and the photogenerated signal, the external power source is electrically disconnected from the holding capacitance 46. That is, the vertical shift register 223 controls the second switch 45 to electrically disconnect the external power source from the holding capacitance 46 when the operational amplifier 40 amplifies the signals from the pixels for each column. With this operation, the influence of disturbance noise on the reference voltage VREF supplied from the holding capacitance 46 to the operational amplifier 40 can be reduced. That is, since a temporal variation in the reference voltage can be suppressed in a noise signal readout period and a photogenerated signal readout period, the system can suppress superposition of disturbance noise on a signal, and prevent random stripe noise from appearing on an image.

The holding capacitance 46 is commonly used by all the columns (see FIGS. 1 and 2). Hence, the system can ensure a circuit space, and reduce the influence of a characteristic variation on an image.

Also, since the PCVR signal is activated immediately after the PT signal is deactivated, a time for supplying the reference voltage VREF to the holding capacitance 46 can be sufficiently ensured.

Note that the second switch 45 inserted between the non-inverting input terminal (+) of the operational amplifier 40 and the external power source may be turned off at least in a noise signal readout time and the photogenerated signal readout time in the signal readout period.

The holding capacitance 46 may be formed as a parasitic capacitance such as a junction capacitance. In this case, space for forming the holding capacitance 46 can be saved to sufficiently ensure circuit space.

Figure 5:
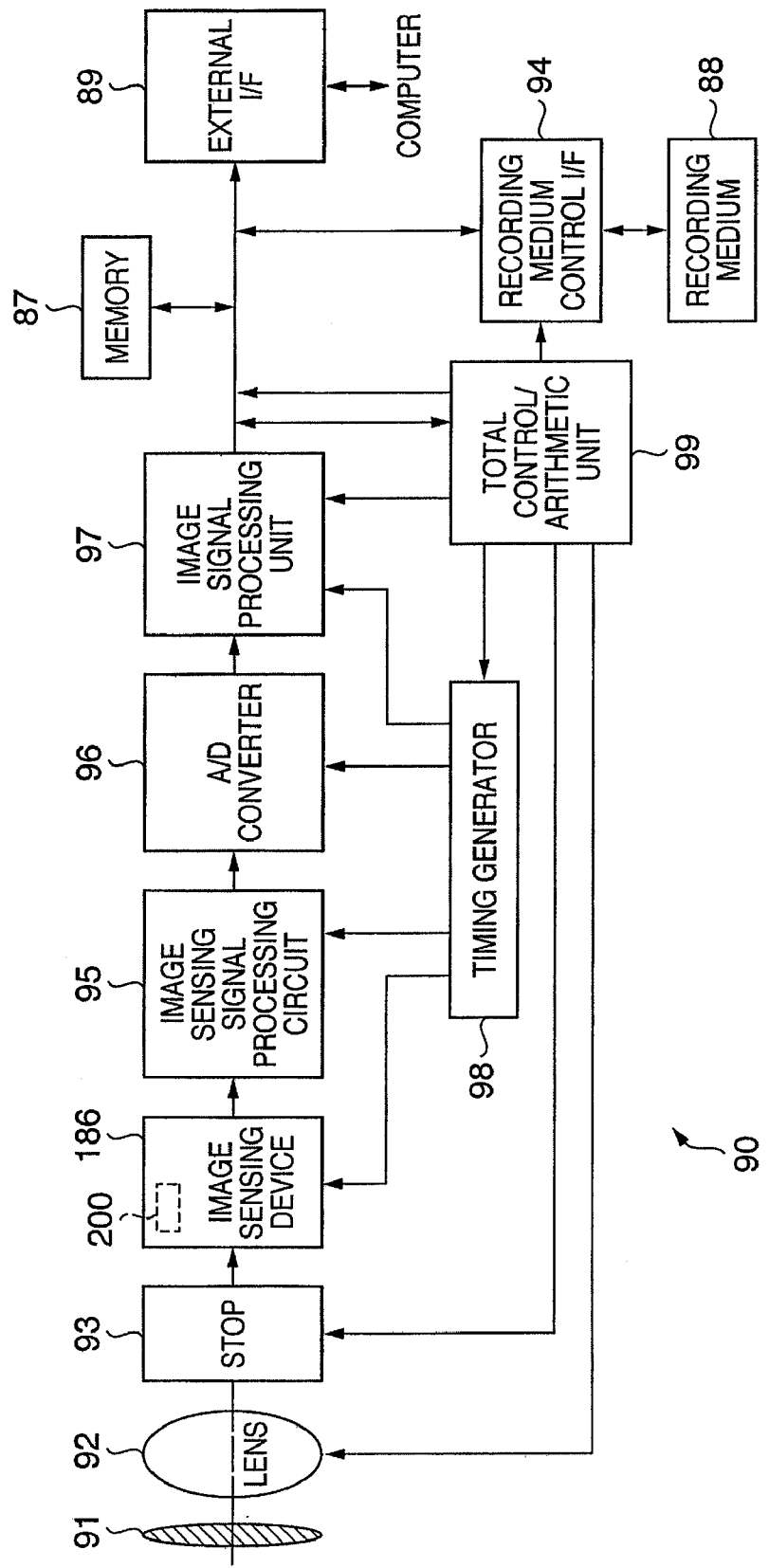
FIG. 5 is a block diagram of an image sensing system to which the photoelectric conversion device is applied according to the first embodiment.

An example of an image sensing system to which the photoelectric conversion device is applied according to the first embodiment will be described with reference to FIG. 5. FIG. 5 is a block diagram of the image sensing system to which the photoelectric conversion device is applied according to the first embodiment.

As shown in FIG. 5, an image sensing system 90 mainly includes an optical system, image sensing device 186, and signal processing unit. The optical system mainly includes a shutter 91, photographing lens 92, and stop 93. The image sensing device 186 includes a photoelectric conversion device 200. The signal processing unit mainly includes an image sensing signal processing circuit 95, A/D converter 96, image signal processing unit 97, memory 87, external I/F 89, timing generator 98, total control/arithmetic unit 99, recording medium 88, and recording medium control I/F 94. Note that the signal processing unit need not include the recording medium 88.

The shutter 91 is arranged in front of the photographing lens 92 in a light path to control exposure.

The photographing lens 92 refracts light which has entered the lens, and forms an object image on the image sensing plane of the photoelectric conversion device 200 of the image sensing device 186.

The stop 93 is set between the photographing lens 92 and the photoelectric conversion device 200 in the light path to adjust the amount of light that has passed through the photographing lens 92 and is guided to the photoelectric conversion device 200.

The photoelectric conversion device 200 of the image sensing device 186 converts, into an image signal, the object image formed on the photoelectric conversion device 200. The image sensing device 186 reads out and outputs the image signal from the photoelectric conversion device 200.

The image sensing signal processing circuit 95 is connected to the image sensing device 186, and processes the image signal output from the image sensing device 186.

The A/D converter 96 is connected to the image sensing signal processing circuit 95, and converts, into a digital signal, the image signal (analog signal) which has been processed and output from the image sensing signal processing circuit 95.

The image signal processing unit 97 is connected to the A/D converter 96, and performs an arithmetic operation such as various correction processes for the image signal (digital signal) output from the A/D converter 96. The image signal processing unit 97 generates image data which is supplied to the memory 87, external I/F 89, total control/arithmetic unit 99, recording medium control I/F 94, and the like.

The memory 87 is connected to the image signal processing unit 97, and stores the image data output from the image signal processing unit 97.

The external I/F 89 is connected to the image signal processing unit 97. With this arrangement, the image data output form the image signal processing unit 97 is transferred to the external device (e.g., a personal computer) via the external I/F 89.

The timing generator 98 is connected to the image sensing device 186, image sensing signal processing circuit 95, A/D converter 96, and image signal processing unit 97. With this arrangement, the timing generator 98 supplies a timing signal to the image sensing device 186, image sensing signal processing circuit 95, A/D converter 96, and image signal processing unit 97. The image sensing device 186, image sensing signal processing circuit 95, A/D converter 96, and image signal processing unit 97 operate in synchronism with the timing signal.

The total control/arithmetic unit 99 is connected to the timing generator 98, image signal processing unit 97, and recording medium control I/F 94, and generally controls the timing generator 98, image signal processing unit 97, and recording medium control I/F 94.

The recording medium 88 is removably connected to the recording medium control I/F 94. With this arrangement, the image data output from the image signal processing unit 97 is recorded in the recording medium 88 via the recording medium control I/F 94.

When a preferred image signal can be obtained in the photoelectric conversion device 200 with the above-described arrangement, a preferred image signal (image data) can be obtained.

Figure 6:
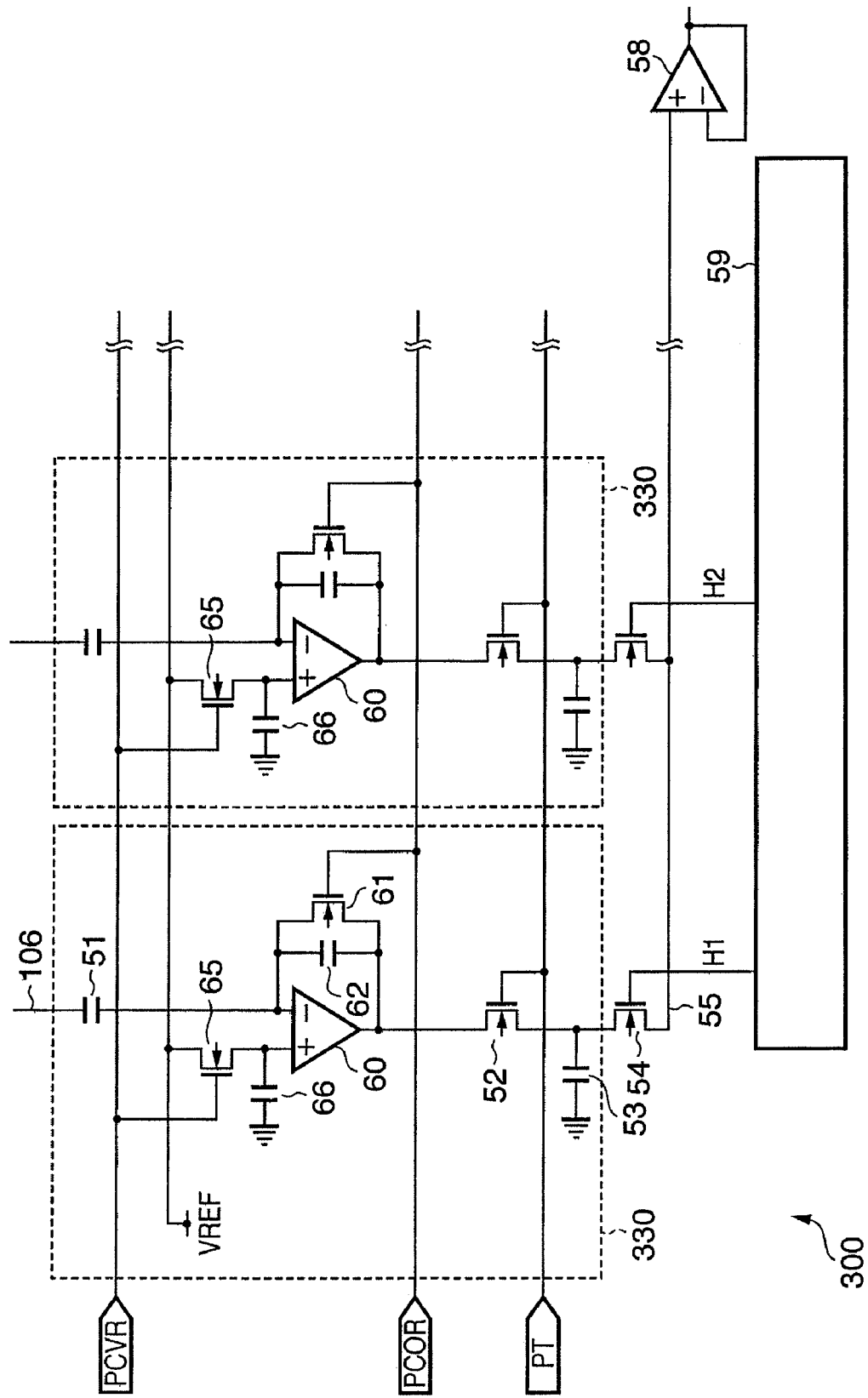
FIG. 6 is a diagram of a photoelectric conversion device according to the second embodiment of the present invention.

A photoelectric conversion device according to the second embodiment of the present invention will be described with reference to FIG. 6. FIG. 6 is a diagram of the photoelectric conversion device according to the second embodiment of the present invention. In this embodiment, what is different from the first embodiment will mainly be described, and a repetitive description will be omitted.

A photoelectric conversion device 300 includes a readout circuit 330 in place of a readout circuit 230, and a readout circuit 330 in place of a readout circuit 230i. Each of the readout circuits 330 corresponding to the second and subsequent columns has the same arrangement as that of the readout circuit 330 corresponding to the first column, and is different from the readout circuit 230i in that one terminal of a holding capacitance 66 is connected to the noninverting input terminal (+) of an operational amplifier 60. The other terminal of the holding capacitance 66 is connected to a power supply or low-impedance wiring such as GND (fixed potential). The timing chart of a signal to operate the operational amplifier 60 and the holding capacitance 66 is the same as that shown in FIG. 4. That is, the plurality of readout circuits 330 each include the operational amplifier 60, the holding capacitance 66, and a switch 65.

As described above, the holding capacitance 66 and the switch 65 are arranged for each of columns of pixels GU11 to GUmn With this arrangement, a temporal variation in a reference voltage can be suppressed in the noise signal readout time and the photogenerated signal readout time, as in the first embodiment. Accordingly, the photoelectric conversion device 300 can also suppress superposition of disturbance noise on a signal, and prevent random stripe noise from appearing on an image.

When sampling and holding the noise signal or the photogenerated signal or when calculating the difference between the noise signal and the photogenerated signal, the external power source is electrically disconnected from the operational amplifier, thereby reducing crosstalk on a chip. Note that a clamp capacitance 51, a capacitance 62, a transistor 61, a transistor 52, a line memory 53, a transistor 54, a horizontal signal line 55, an output circuit 58, and a horizontal shift register 59 may be respectively like a clamp capacitance 31, a capacitance 42, a transistor 41, a transistor 32, a line memory 33, a transistor 34, a horizontal signal line 35, an output circuit 38, and a horizontal shift register 39, in FIG. 2.

Figure 7:
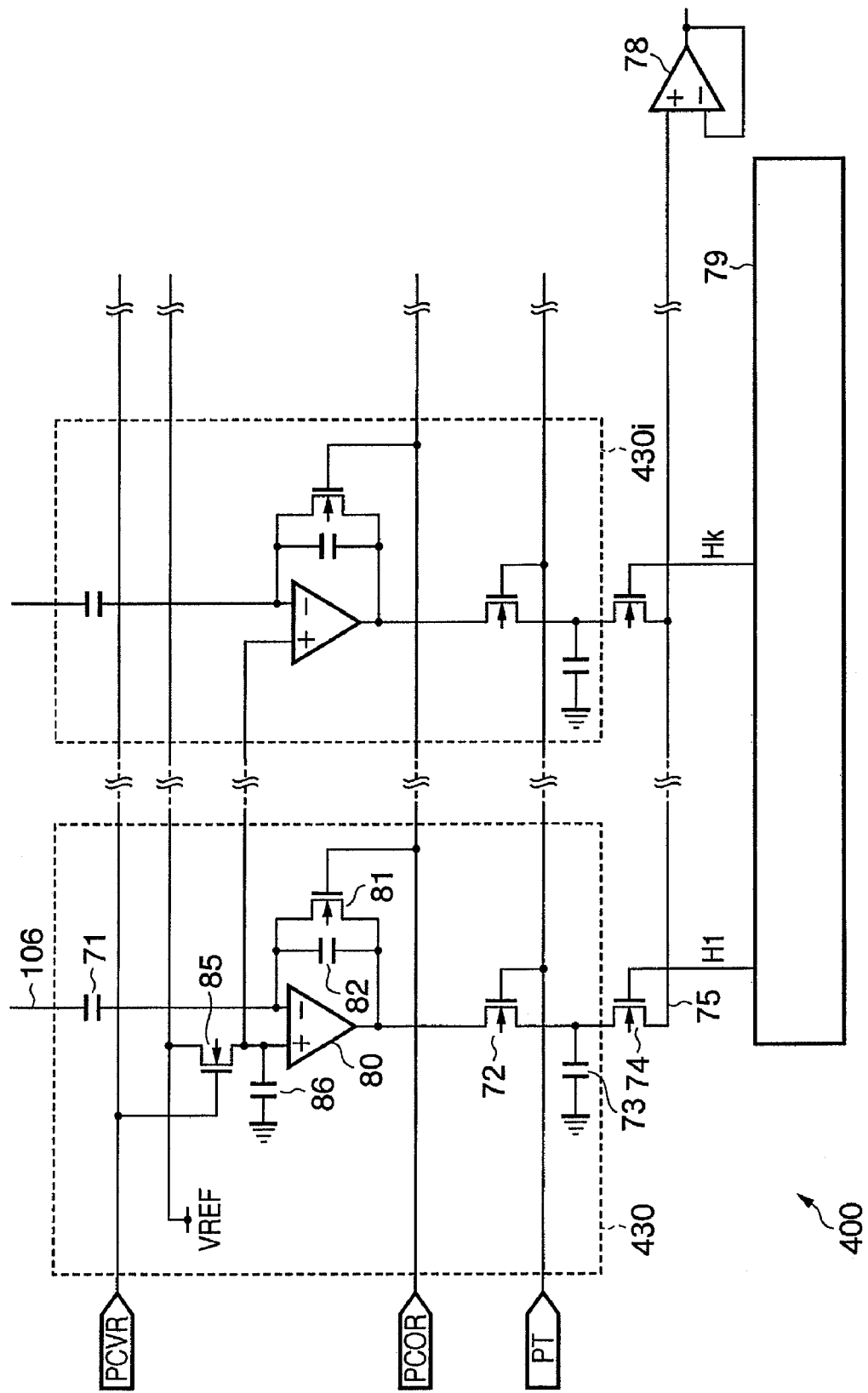
FIG. 7 is a diagram of a photoelectric conversion device according to the third embodiment of the present invention.

A photoelectric conversion device according to the third embodiment of the present invention will be described next with reference to FIG. 7. FIG. 7 is a diagram of the photoelectric conversion device according to the third embodiment of the present invention. In this embodiment, what is different from the first embodiment will mainly be described, and a repetitive description will be omitted.

A photoelectric conversion device 400 includes readout circuits 430 and 430i in place of readout circuits 230 and 230i.

The readout circuits 430 are arranged every k (k<n; natural number) columns of pixels GU11 to GUmn. The readout circuits 430i are arranged for the other columns.

For example, in a first k-column group including $1^{st}$ to $k^{th}$ columns, when a readout circuit 430 is arranged for the $1^{st}$ column, readout circuits 430i are arranged for the $2^{nd}$ to $k^{th}$ columns. In a second k-column group including column (k+1) to column (2k), when another readout circuit 430 is arranged for column (k+1), readout circuits 430i are arranged for column (k+2) to (2k). This arrangement is repeated for all remaining k-column groups. That is, the plurality of readout circuits are implemented by repeating a k-column group of readout circuits (430 and 430i) in which a holding capacitance 86 and a switch 85 are commonly used (shared). The timing chart of a signal to operate an operational amplifier 80 and the holding capacitance 86 is the same as in FIG. 4.

As described above, since the holding capacitances 86 are commonly used every k columns (every k-column group), a circuit space can be ensured. When sampling and holding a noise signal or a photogenerated signal or when calculating the difference between the noise signal and the photogenerated signal, the external power source is electrically disconnected from the operational amplifier, thereby reducing crosstalk on a chip.

A temporal variation in the reference voltage can be suppressed in the noise signal readout time and the photogenerated signal readout time, similar to the first embodiment. Accordingly, the photoelectric conversion device 400 can also suppress superposition of disturbance noise on a signal, and prevent random stripe noise from appearing on an image.

In this embodiment, the holding capacitance 86 and the switch 85 are commonly used by the readout circuits every k columns (every k-column group), and this arrangement is repeated. However, although an example has been used here in which a holding capacitance 86 and a switch 85 are shared for each of the readout circuits of a predetermined number (k) columns, the present invention is not limited to such an arrangement and, there may be a units in which the number of shared columns differs. That is, the holding capacitance and the switch may be commonly used by at least some of the plurality of readout circuits. Note that a clamp capacitance 71, a capacitance 82, a transistor 81, a transistor 72, a line memory 73, a transistor 74, a horizontal signal line 75, an output circuit 78, and a horizontal shift register 79 may be respectively like a clamp capacitance 31, a capacitance 42, a transistor 41, a transistor 32, a line memory 33, a transistor 34, a horizontal signal line 35, an output circuit 38, and a horizontal shift register 39, in FIG. 2.

Figure 8:
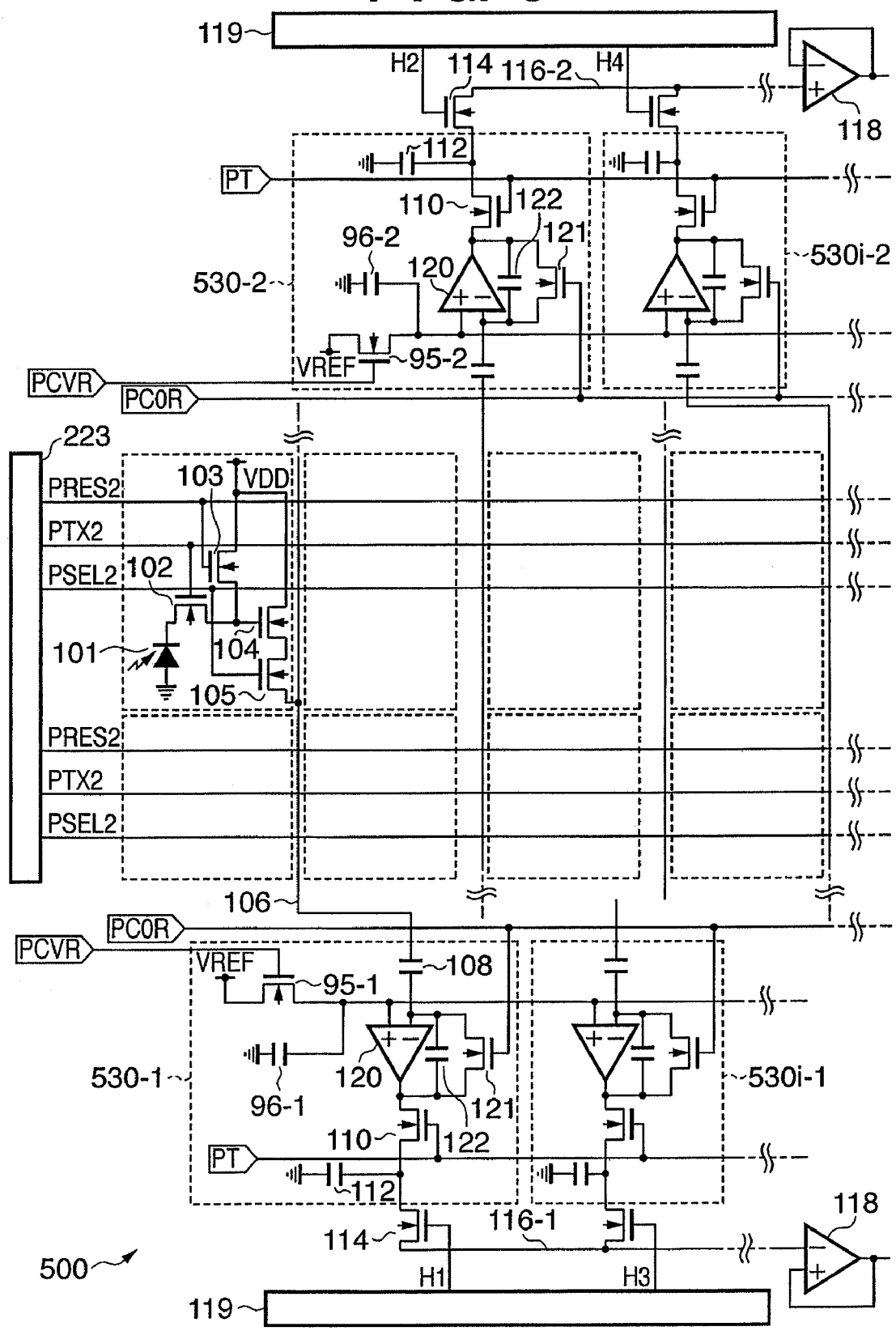
FIG. 8 is a diagram of a photoelectric conversion device according to the fourth embodiment of the present invention.

A photoelectric conversion device according to the fourth embodiment of the present invention will be described with reference to FIG. 8. FIG. 8 is a diagram of the photoelectric conversion device according to the fourth embodiment of the present invention. In this embodiment, what is different from the first embodiment will mainly be described, and a repetitive description will be omitted.

A photoelectric conversion device 500 is different from that in the first embodiment in that the photoelectric conversion apparatus 500 includes a plurality of output channels (the first and second output channels). The first output channel includes first readout circuits 530-1 and 530i-1. The second output channel includes second readout circuits 530-2 and 530i-2. Each of the first readout circuits 530-1 and 530i-1 is connected to one terminal of a corresponding one of at least some of a plurality of vertical signal lines 106. Each of the second readout circuits 530-2 and 530i-2 is connected to the other terminal of a corresponding one of at least some of the plurality of vertical signal lines 106 except for the plurality of vertical signal lines connected to the first readout circuits.

For example, pixels of the first pixel column (first column) from the left end in FIG. 8 are connected to the first readout circuit 530-1 via the vertical signal line 106, and those of the odd-numbered pixel columns (first columns) from the left end except for the first pixel column are connected to the first readout circuits 530i-1 arranged for the respective columns. The first readout circuits 530-1 and 530i-1 output, to a first output line 116-1, the signals output from the connected pixels.

On the other hand, the pixels of the second pixel column (second column) from the left end in FIG. 8 are connected to the second readout circuit 530-2, and those of the even-numbered pixel columns (second columns) except for the second pixel column are connected to the second readout circuits 530i-2 arranged for the respective columns. The second readout circuits 530-2 and 530i-2 output, to a second output line 116-2, the signals output from the connected pixels.

As described above, the first and second readout circuits in the first and second output channels concurrently read out the signals from the pixels of the first and second columns. As a result, the signals can be read out at higher speed.

Note that the first readout circuits 530-1 and 530i-1 share a holding capacitance 96-1 and a second switch 95-1, and the second readout circuits 530-2 and 530i-2 share a holding capacitance 96-2 and a second switch 95-2. That is, all the plurality of first readout circuits 530-1 and 530i-1 share the holding capacitance 96-1 and the switch 95-1, and all the plurality of second readout circuits 530-2 and 530i-2 share the holding capacitance 96-2 and the switch 95-2. A clamp capacitance 108, operational amplifier 120, a capacitance 122, a transistor 121, a transistor 110, a line memory 112, a transistor 114, an output circuit 118, and a horizontal shift register 119, in each readout circuit, may be respectively like a clamp capacitance 31, operational amplifier 40, a capacitance 42, a transistor 41, a transistor 32, a line memory 33, a transistor 34, an output circuit 38, and a horizontal shift register 39, in FIG. 2.

In this embodiment, readout circuits 530-n and 530i-n on one side share the holding capacitance and the switch. However, the arrangement may be implemented as in the second or third embodiment. That is, each of the plurality of first readout circuits may include the operational amplifier, holding capacitance, and switch, and each of the plurality of second readout circuits may include the operational amplifier, holding capacitance, and switch. Alternatively, the plurality of first readout circuits may be implemented by repeating a first readout circuit group (a first k-column group) in which the holding capacitance and the switch are commonly used, and the plurality of second readout circuits may be implemented by repeating a second readout circuit group (a second k-column group) in which the holding capacitance and the switch are commonly used. Alternatively, some of the readout circuits may share the holding capacitance and the switch in each of the first and second output channels. That is, at least some of the first and second readout circuits may share the holding capacitance and the switch.

Also, the number of channels for reading out signals is not limited to 2.

In the above embodiments, the holding capacitance and the switch are parallelly connected to the operational amplifier. However, the holding capacitance and the switch may be connected in series with the operational amplifier such that the switch is arranged between the holding capacitance and the operational amplifier. In this case, the arrangement needs to be added for providing a reset potential (fixed potential) to the terminal of the holding capacitance connected to the reference input terminal of the operational amplifier. More specifically, for example, the terminal of the holding capacitance to be connected to the reference input terminal of the operational amplifier may be connected to the power supply which supplies the reset potential via the switch (reset switch).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-236753 filed Aug. 31, 2006 and Japanese Patent Application No. 2007-201101 filed Aug. 1, 2007, which are hereby incorporated by reference herein in their entirety.

What is claimed is:

1. A photoelectric conversion device comprising:
a pixel array in which a plurality of pixels are arrayed in a row direction and a column direction, each pixel including a photoelectric conversion unit and an amplification unit, which outputs a signal corresponding to a charge signal accumulated in the photoelectric conversion unit;
a plurality of readout circuits, which read out signals output from pixels for respective columns in the pixel array; and
a control unit, which controls the plurality of readout circuits,
wherein each of the plurality of readout circuits includes
a holding unit, which holds a reference voltage supplied from an external power source,
an operational amplification unit, which amplifies the signals from the pixels for each column based on the reference voltage held in the holding unit, and
a disconnection unit, which electrically disconnects the holding unit from the external power source, and
wherein the control unit controls the disconnection unit to electrically disconnect the holding unit from the external power source when the operational amplification unit amplifies the signals from the pixels for each column.

2. The device according to claim 1, wherein
each of at least some of the plurality of readout circuits includes
an operational amplifier, which amplifies the signal input from the amplification unit of the pixel based on a voltage input via a reference input node,
a holding capacitance connected to the reference input node, and
a switch connected between the reference input node and a reference voltage line for applying the reference voltage to the reference input node, and
the control unit controls the switch to disconnect the operational amplifier from the reference voltage line when the operational amplifier amplifies the signals from the pixels for the each column.

3. The device according to claim 2, wherein
one terminal of the holding capacitance is connected to the reference input node, and
the other terminal connected to a fixed potential.

4. The device according to claim 2, wherein
one terminal of the holding capacitance is connected to the reference input node, and
the other terminal connected to the switch,
and the one terminal is connected to a power supply for supplying a fixed potential via a reset switch.

5. The device according to claim 2, wherein
all of the plurality of readout circuits share the holding capacitance and the switch.

6. The device according to claim 2, wherein
each of the plurality of readout circuits includes
the operational amplifier,
the holding capacitance, and
the switch.

7. The device according to claim 2, wherein
the plurality of readout circuits are implemented by repeating a readout circuit group in which the holding capacitance and the switch are commonly used.

8. The device according to claim 2, further comprising
a plurality of vertical signal lines connected to the pixels for the respective columns in the pixel array,
wherein the plurality of readout circuits include
a first readout circuit connected to one terminal of a corresponding one of at least some of the plurality of vertical signal lines, and
a second readout circuit connected to the other terminal of a corresponding one of at least some of the plurality of vertical signal lines except for a vertical signal line connected to the first readout circuit, and
the first readout circuit and the second readout circuit concurrently read out signals from pixels of a first column and a second column.

9. The device according to claim 8, wherein
all of a plurality of the first readout circuits share the holding capacitance and the switch, and
all of a plurality of the second readout circuits share the holding capacitance and the switch.

10. The device according to claim 8, wherein
each of a plurality of the first readout circuits includes
the operational amplifier,
the holding capacitance, and
the switch, and
each of a plurality of the second readout circuits includes
the operational amplifier,
the holding capacitance, and
the switch.

11. The device according to claim 8, wherein
a plurality of the first readout circuits are implemented by repeating a first readout circuit group in which the holding capacitance and the switch are commonly used, and
a plurality of the second readout circuits are implemented by repeating a second readout circuit group in which the holding capacitance and the switch are commonly used.

12. The device according to claim 2, wherein
the holding capacitance is formed as a parasitic capacitance.

13. A photoelectric conversion device according to claim 1, wherein the photoelectric conversion device is incorporated in an image sensing system that includes:
an optical system, which forms an image on an image sensing plane of the photoelectric conversion device; and
a signal processing unit, which processes a signal output from the photoelectric conversion device, and generates image data.

14. A driving method for a photoelectric conversion device that includes a pixel array in which a plurality of pixels are arrayed in a row direction and a column direction, and a readout circuit, which reads out signals output from pixels in the pixel array, wherein each pixel includes a photoelectric conversion unit and an amplification unit that outputs a signal corresponding to a charge signal accumulated in the photoelectric conversion unit, and the readout circuit includes a holding unit, which holds a reference voltage applied from an external power source, the method comprising:
an application step of supplying the reference voltage from the external power source to the holding unit;
a disconnection step of electrically disconnecting the holding unit from the external power source after the application step; and
an amplification step of amplifying signals from pixels for each column based on the reference voltage held by the holding unit after the disconnection step.

15. The device according to claim 2, wherein
at least some of the plurality of readout circuits share the holding capacitance and the switch.

16. The device according to claim 8, wherein
at least some of a plurality of the first readout circuits share the holding capacitance and the switch, and
at least some of a plurality of the second readout circuits share the holding capacitance and the switch.

* * * * *